(12) United States Patent
Koike et al.

(10) Patent No.: US 7,574,897 B2
(45) Date of Patent: Aug. 18, 2009

(54) DEVICE FOR DETECTING LEAKAGE OF LIQUID IN TANK

(75) Inventors: Atsushi Koike, Ageo (JP); Toshimi Nakamura, Ageo (JP); Tsutomu Makino, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 281 days.

(21) Appl. No.: 11/791,685

(22) PCT Filed: Nov. 21, 2005

(86) PCT No.: PCT/JP2005/021364

§ 371 (c)(1),
(2), (4) Date: May 25, 2007

(87) PCT Pub. No.: WO2006/057219

PCT Pub. Date: Jun. 1, 2006

(65) Prior Publication Data

US 2008/0121022 A1    May 29, 2008

(30) Foreign Application Priority Data

Nov. 29, 2004    (JP) ............... 2004-344109

(51) Int. Cl.
G01M 3/04    (2006.01)
(52) U.S. Cl. .......................... 73/49.2; 73/40
(58) Field of Classification Search .......... 73/49.2, 73/40
See application file for complete search history.

(56) References Cited

U.S. PATENT DOCUMENTS 3,331,245 A * 7/1967 Barker .................. 73/313
3,650,151 A * 3/1972 Drexel .................. 73/861.04
4,791,814 A * 12/1988 Nee ..................... 73/49.2
4,862,734 A * 9/1989 Elderton ................. 73/49.2
4,967,592 A * 11/1990 Lagergren et al. ......... 73/49.2
5,189,904 A * 3/1993 Maresca et al. ......... 73/40.5 R
5,254,976 A * 10/1993 Schueler ................ 340/605

(Continued)

FOREIGN PATENT DOCUMENTS

JP    58-086429    5/1983

(Continued)

*Primary Examiner*—Hezron Williams
*Assistant Examiner*—Rodney T Frank
(74) *Attorney, Agent, or Firm*—Frommer Lawrence & Haug LLP; Ronald R. Santucci (57) ABSTRACT

A device for detecting leakage of liquid in a tank, capable of detecting the leakage at high accuracy and sensitivity for a wide range of a leakage quantity. A flow rate sensor section attached to a measurement fine tube (13b) includes temperature sensors (133, 134) and an indirectly heated sensor (135). A leakage detection control section connected to a pressure sensor (137) for measuring a liquid level and to the flow rate sensor section has a voltage generation circuit (67) for applying a voltage to a heater (163) of the indirectly heated sensor, a first leakage detection circuit (71), and a second leakage detection circuit for generating an output corresponding to temperature sensed by the indirectly heated sensor (135). First leakage detection using an output of the first leakage detection circuit, second leakage detection using an output of the pressure sensor, and third leakage detection using an output of the second leakage detection circuit are performed, and at least one of the results of the detections is outputted.

8 Claims, 7 Drawing Sheets

U.S. PATENT DOCUMENTS

| | | | |
|---|---|---|---|
| 5,284,048 A * | 2/1994 | Horner | 73/49.2 |
| 5,375,455 A * | 12/1994 | Maresca et al. | 73/40.5 R |
| 5,445,010 A * | 8/1995 | Peacock | 73/49.2 |
| 5,767,393 A * | 6/1998 | Robertson | 73/49.2 |
| 5,861,547 A * | 1/1999 | Kawai et al. | 73/49.2 |
| 6,920,778 B2 * | 7/2005 | Koike et al. | 73/49.2 |
| 7,334,455 B2 * | 2/2008 | Yanagi et al. | 73/49.2 |
| 2007/0157706 A1 * | 7/2007 | Yanagi et al. | 73/49.2 |
| 2008/0115565 A1 * | 5/2008 | Yanagi et al. | 73/49.2 |
| 2008/0184775 A1 * | 8/2008 | Yamagishi et al. | 73/25.05 |

FOREIGN PATENT DOCUMENTS

| | | |
|---|---|---|
| JP | 9-510291 | 10/1997 |
| JP | 2003-185522 | 7/2003 |
| JP | 2003-214974 | 7/2003 |
| JP | 2003-302271 | 10/2003 |

* cited by examiner

DEVICE FOR DETECTING LEAKAGE OF LIQUID IN TANK

This application is a 371 of PCT/JP2005/021364 filed on Nov. 21, 2005, published on Jun. 1, 2006 under publication number WO 2006/057219 A1 which claims priority benefits from Japanese Patent Application Number 2004-344109 filed Nov. 29, 2004, the disclosure of which is hereby incorporated by reference.

TECHNICAL FIELD

The present invention relates to a device for detecting leakage of liquid in a tank and, more specifically, to a device for detecting leakage of liquid from a tank by converting it into a flow value based on the liquid level variation of liquid in a tank.

BACKGROUND ART

Fuel oil, liquid chemicals and the like are stored in tanks. In recent years, for example, a centralized oiling system for collective housing has been proposed. In this system, kerosene is supplied to respective home from a centralized kerosene tank through pipes.

The tank may suffer some cracks due to time degradation. In this case, liquid in the tank leaks from the tank. It is very important to detect such leakage as soon as possible and cope with it adequately for preventing explosion and fire hazard, ambient pollution, or generation of poisonous gas.

As a detection device for detecting leakage of liquid in a tank in the shortest possible time, JP(A)-2003-185522 (Patent Document 1) has proposed a configuration that includes a measurement pipe into which liquid in a tank is introduced and a measurement slim-pipe provided below the measurement pipe and measures the liquid flow rate inside the measurement slim-pipe using a sensor section additionally provided to the measurement slim-pipe to detect a minute variation of the liquid surface in the tank, i.e., a liquid level variation.

In this liquid leakage detection device, an indirectly heated flowmeter is used as a sensor additionally provided to the measurement slim-pipe. In this flowmeter, a current is applied to heat a heating element, and a part of the heating value is allowed to be absorbed by liquid. Then, the heat absorption value of the liquid varies in accordance with the liquid flow rate. This characteristic is used to detect influence of the heat absorption based on a variation in an electrical characteristic value such as a resistance value caused by a temperature variation of a temperature-sensitive element.

However, in the indirectly heated flowmeter used in the liquid leakage detection device disclosed in the above Patent Document 1, a variation in an electric circuit output level with respect to a variation in a liquid flow rate becomes small in the region where the flow rate value is as infinitesimal as, e.g., 1 milliliter/h or less, so that an error in the flow rate measurement value tends to increase. Thus, there is a limit to an improvement in leakage detection accuracy.

Further, there is a known flow rate sensor that measures fluid flow rate based on temperature difference between two fixed points. In the flow rate measurement based on temperature difference between two fixed points, fluid is heated by a heat source disposed at a given position in a pipe, temperature sensitive elements are disposed at an appropriate interval on the upstream and downstream sides of the heater with respect to the fluid distribution direction in the pipe, and the fluid flow rate is measured based on a temperature difference which is caused between the upstream-side temperature sensitive element and downstream-side temperature sensitive element when the fluid in the pipe is distributed. However, when the flow rate value becomes 3 milliliter/h or more, a variation in an electric circuit output level with respect to a variation in a liquid flow rate becomes small, so that an error in the flow rate measurement value tends to increase in the large flow rate region (that is, the rate of the flow rate difference that can be discriminated when the measurement is carried out is increased to reduce the sensitivity).

Patent Document 1: JP(A)-2003-185522

DISCLOSURE OF THE INVENTION

Problems to be Solved by the Invention

Therefore, an object of the present invention is to provide a device for detecting leakage of liquid in a tank capable of detecting leakage of liquid in a tank with excellent precision and sensitivity over a broad leakage amount range, from extremely small amount to comparatively large leakage amount.

Means for Solving the Problems

To achieve the above object, according to an aspect of the present invention, there is provided a device for detecting leakage of liquid in a tank characterized by comprising: a measurement slim-pipe into/from the lower end of which the liquid in a tank is injected or discharged; a measurement pipe connected to the upper end of the measurement slim-pipe and having a cross-section area larger than that of the measurement slim-pipe;

a flow rate sensor section for measuring the flow rate of liquid in the measurement slim-pipe, which is additionally provided to the measurement slim-pipe and includes a first temperature sensor, indirectly heated sensor and a second temperature sensor, the indirectly heated sensor being provided with a heater and third temperature sensor; a pressure sensor for measuring the liquid level of the liquid; and a leakage detection controller connected to the flow rate sensor section and pressure sensor. The leakage detection controller has: a voltage generation circuit for applying a voltage to the heater; a first leakage detection circuit which is connected to the first and second temperature sensors and generates an output corresponding to a difference between temperatures sensed by the first and second temperature sensors; and a second leakage detection circuit which is connected to the indirectly heated sensor and generates an output corresponding to a temperature sensed by the third temperature sensor, performs: a first leakage detection to detect leakage of liquid in the tank based on a value equivalent to the liquid flow rate calculated using the output of the first leakage detection circuit; a second leakage detection to detect leakage of liquid in the tank based on the liquid level variation rate with respect to time measured by the pressure sensor; and a third leakage detection to detect leakage of liquid in the tank based on a value equivalent to the liquid flow rate calculated using the output of the second leakage detection circuit, and outputs at least one of detection results of the first to third leakage detections that fall within first to third predetermined ranges which are defined for each of the first to third leakage detections.

In the aspect of the present invention, in the case where a plurality of detection results that fall within the first to third predetermined ranges are obtained in the first to third leakage detections, the leakage detection controller outputs only one detection result by selecting it in the order of a detection result of second leakage detection, that of first leakage detection, and that of third leakage detection.

In the aspect of the present invention, the leakage detection controller stops the first and second leakage detections for a predetermined time period in the case where the detection result of the second leakage detection falls above the second predetermined range. In the aspect of the present invention, the leakage detection controller stops operations of the voltage generation circuit and first and second leakage detection circuits for predetermined time period in the case where the detection result of the second leakage detection falls above the second predetermined range.

In the aspect of the present invention, the voltage generation circuit is a constant voltage generation circuit for applying a constant voltage to the heater.

In the aspect of the present invention, the measurement pipe is detachably attached to the leakage detection device. In the aspect of the present invention, the pressure sensor is disposed near the lower end of the measurement slim-pipe. In the aspect of the present invention, a circuit container is attached to the upper portion of the measurement pipe, and the leakage detection controller is disposed in the circuit container.

ADVANTAGES OF THE INVENTION

A liquid leakage detecting device according to the present invention includes: a flow rate sensor section including a first temperature sensor, indirectly heated sensor provided with a heater and third temperature sensor, and a second temperature sensor; a pressure sensor for measuring the liquid level; and a leakage detection controller connected to the flow rate sensor section and pressure sensor. The leakage detection controller has: a voltage generation circuit for applying a voltage to the heater; a first leakage detection circuit for generating an output using the first and second temperature sensors; and a second leakage detection circuit for generating an output using the third temperature sensor of the indirectly heated sensor. The leakage detection controller performs a first leakage detection using the first leakage detection circuit, a second leakage detection using the pressure sensor, and a third leakage detection using the second leakage detection circuit and outputs at least one of detection results of the first to third leakage detections that fall within first to third predetermined ranges. As a result, it is possible to cover a broad leakage amount range by using the first to third predetermined ranges which are appropriately set for the first to third leakage detections having different optimum detection sensitivity areas to thereby detect the leakage of liquid with excellent precision and sensitivity.

In the drawings, reference numeral 1 denotes a tank, 2 top panel, 3 side panel, 4 bottom panel, 5 measurement port, 6 liquid inlet, 7 liquid supply port, L liquid, LS liquid surface, 11 leakage detection device, 12 liquid inlet/outlet, 12a filter, 12b filter cover, 13 flow rate measurement section, 13a sensor holder, 13b measurement slim-pipe, 133 first temperature sensor, 134 second temperature sensor, 135 indirectly heated sensor, 137 pressure sensor, 14 liquid pool section, G space, 15 circuit container, 15a leakage detection controller, 16 cap, 16a air path, 161 heat transfer member, 162 thin-film temperature sensitive element, 162' wiring, 163 thin-film heating element, 163' wiring, 164 dielectric thin-film, 17,171 sheath pipe, Pg guide pipe, 18 wiring, 181 heat transfer member, 182 thin-film temperature sensitive element, 182' wiring, 22,23 plastic sealing member, 24 wiring board, 30 first detection circuit, 32 second detection circuit, 34 calculation section, 60,61 thin-film temperature sensitive element, 62,63,63' resistor, 65 differential amplifier, 66,66' A/D converter, 67 voltage generation circuit, 68 CPU, 69 clock, 70 memory, 71 first leakage detection device, and 73 an A/D converter.

BEST MODE FOR CARRYING OUT THE INVENTION

Embodiments of the present invention will be described below with reference to the accompanying drawings.

Figure 1:
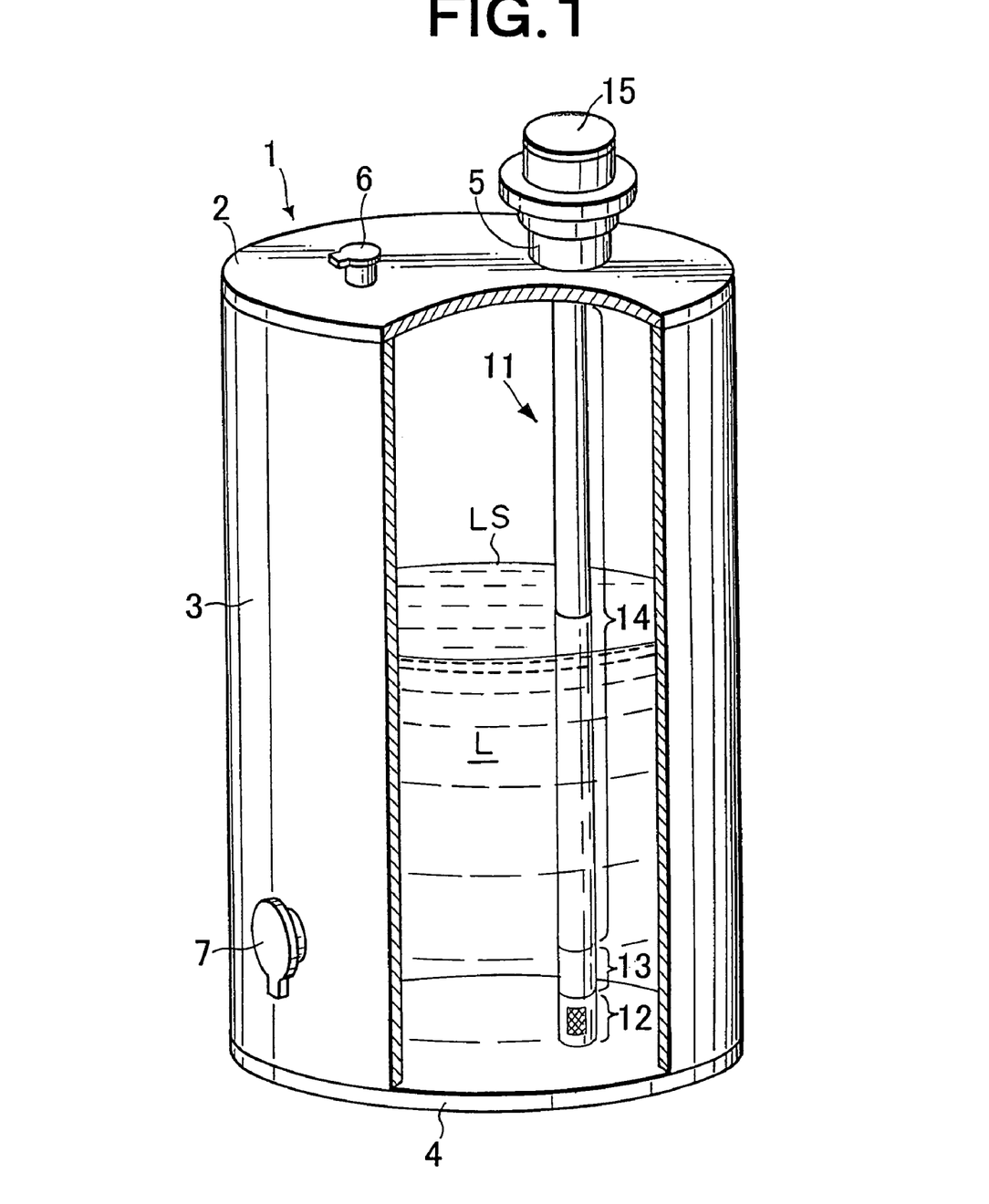
FIG. 1 is a partly broken perspective view for explaining a device for detecting leakage of liquid in a tank according to an embodiment of the present invention.
Figure 2:
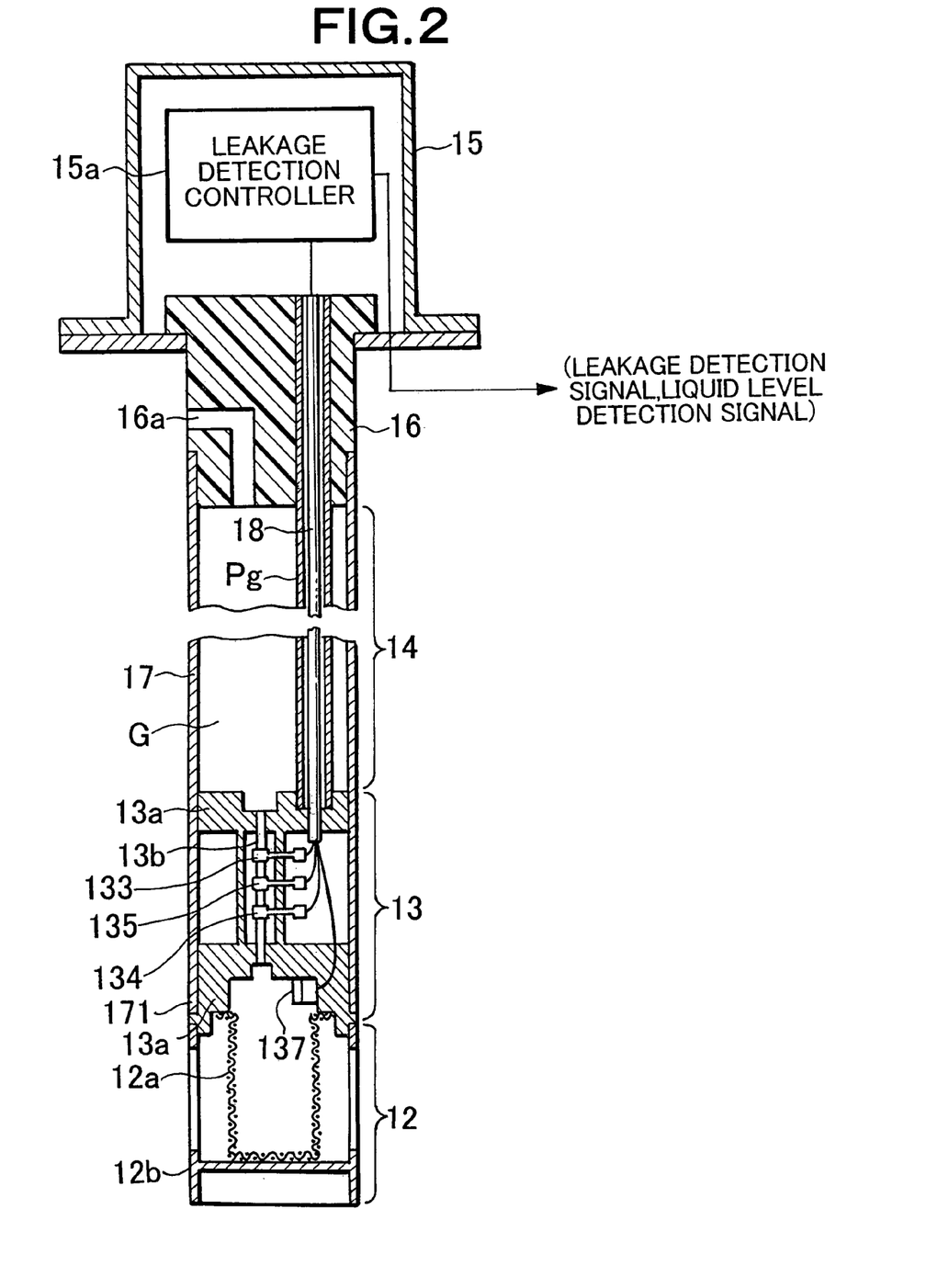
FIG. 2 is a partly omitted cross-sectional view showing the leakage detection device of FIG. 1.

FIG. 1 is a partly broken perspective view for explaining a device for detecting leakage of liquid in a tank according to an embodiment of the present invention. FIG. 2 is a partly omitted cross-sectional view showing the leakage detection device according to the present embodiment.

A tank 1 has: a top panel 2 in which a measurement port 5 and a liquid inlet 6 used when liquid is injected into the tank are formed; a side panel 3 in which a liquid supply port 7 used when liquid in the tank is supplied to the outside is formed; and a bottom panel 4. As shown in FIG. 1, liquid (flammable liquid having a low viscosity such as gasoline, gas oil, kerosene, or the like) L is contained in the tank 1. LS denotes a liquid surface.

Figure 3A:
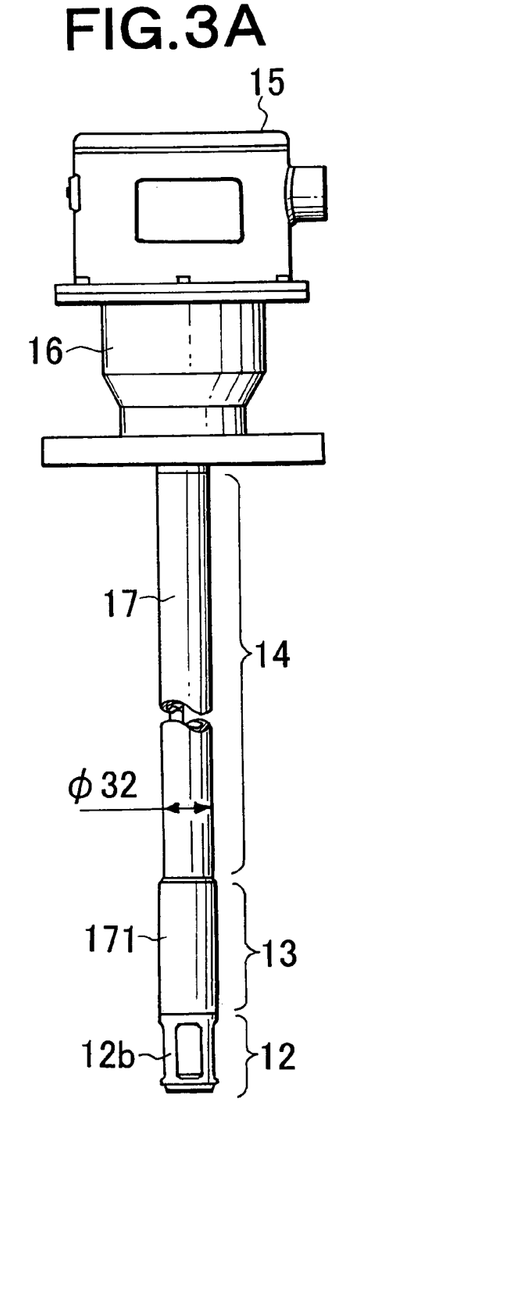
FIGS. 3A and 3B are partly omitted front views showing the leakage detection device of FIG. 1.

A leakage detection device 11 is inserted in part into the tank 1 through the measurement port 5 formed in the top panel 2 of the tank 1 and is disposed in the vertical direction, as a whole. The leakage detection device 11 includes a liquid lead-in/lead-out section or liquid inlet/outlet 12, a flow rate measurement section 13, a liquid storage section or liquid pool section 14, a cap 16, and a circuit container 15. The liquid inlet/outlet 12, flow rate measurement section 13, and liquid pool section 14 are located inside the tank 1. The liquid surface LS is positioned within the height range of the liquid pool section 14. As shown in FIGS. 2 and 3(A), the flow rate measurement section 13 includes a sheath pipe 171 extending over them in the vertical direction, and liquid pool section 14 includes a measurement tube or sheath pipe 17 extending over them in the vertical direction.

As shown in FIG. 2, a sensor holder 13a is disposed in the sheath pipe 171 in the flow rate measurement section 13. A measurement fine tube or measurement slim-pipe 13b extending in the vertical direction is fixedly held by the sensor holder 13a. A first temperature sensor 133, an indirectly heated sensor 135, and a second temperature sensor 134 are disposed in the measurement slim-pipe 13b from above in the order mentioned and attached thereto. The indirectly heated sensor 135 is equally spaced apart from the first and second temperature sensors 133 and 134. The outside of the sensor holder 13a is covered with the sheath pipe 171, thereby protecting the first temperature sensor 133, indirectly heated sensor 135, and second temperature sensor 134 from being corroded by the liquid L. The measurement slim-pipe 13b functions as a liquid distribution channel between the liquid pool section 14 and liquid inlet/outlet 12. The first temperature sensor 133, indirectly heated sensor 135, and second temperature sensor 134 constitute a flow rate sensor section for measuring the flow rate of liquid in the measurement slim-pipe 13b.

A pressure sensor 137 is attached to the sensor holder 13a at the portion near the lower end of the measurement slim-pipe 13b in the flow rate measurement section 13. The pressure sensor 137, which is for measuring the liquid level of liquid L in the tank, can be a piezo element or condenser type sensor and outputs an electrical signal corresponding to the liquid level, e.g., a voltage signal.

In the liquid inlet/outlet 12, as shown in FIG. 2, a filter cover 12b fixes a filter 12a to the lower portion of the sensor holder 13a. The filter 12a has a function of removing foreign substances such as sludge floated or deposited in the liquid in the tank and introducing only the liquid into the liquid pool section 14 through the measurement slim-pipe 13b. An opening is formed in the side wall of the filter cover 12b, and the liquid L in the tank 1 is introduced into the measurement slim-pipe 13b through the filter 12a of the liquid inlet/outlet 12.

The liquid pool section 14 is located above the flow rate measurement section 13 and has a space G surrounded by the sheath pipe 17. Liquid introduced through the measurement slim-pipe 13b is pooled in the space G. The cap 16 is fixed at the upper portion of the sheath pipe 17 and has an air path 16a for communicating the space in the liquid pool section 14 with space in the tank 1 outside the detection device. The circuit container 15, which is attached to the cap 16, contains a leakage detection controller 15a. A guide pipe Pg extends in the sheath pipe 17 so as to connect the upper portion of the sensor holder 13a and cap 16 and, inside the guide pipe Pg, a wiring 18 extends so as to connect the first temperature sensor 133, indirectly heated sensor 135, second temperature sensor 134, and pressure sensor 137 of the flow rate measurement section 13 with the leakage detection controller 15a, respectively.

The sheath pipe 17 in the liquid pool section 14 serves as a measurement pipe of the present invention. The cross-section area of the measurement slim-pipe 13b is set much smaller (e.g., 1/50 or less, 1/100 or less, or 1/300-fold or less) than that of the sheath pipe 17 (excluding the cross-section area of the guide pipe Pg). This configuration allows liquid distribution in the measurement slim-pipe 13b to be measurable even in the case of a slight liquid leakage accompanied by a slight liquid level variation.

Figure 3B:
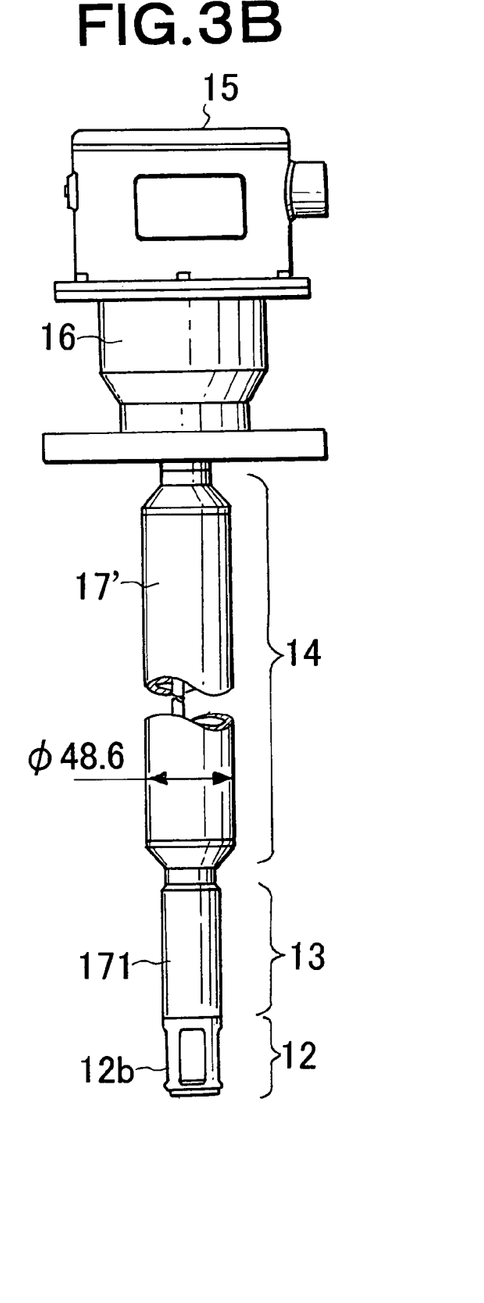

The sheath pipe 17 serving as a measurement pipe in the present embodiment is detachably attached to the leakage detection device. More specifically, the lower end portion holder 13a by screw or the like, and upper end portion thereof is detachably attached to the cap 16 by screws or the like. Therefore, as shown in FIG. 3B, it is possible to use, as a substitute for the sheath pipe 17, a sheath pipe 17' having a different inner cross-section area.

The significance that the measurement pipe is made detachable to the leakage detection device is as follows. That is, there exist tanks of a variety of sizes and, when a leakage detecting device provided with a measurement pipe having a given constant cross-section area is used to perform measurement of liquid leakage for respective tanks, even if the amounts or liquid leakages in the tanks are the same, the flow rate values detected by the flow rate sensor section differ from one another because the horizontal cross-section area inside the tank differs depending on the size of the tank. In other words, even if the flow rate values detected by the leakages from respective tanks differ from one another for the same reason. Thus, in order to determine the amount of liquid leakage from the tank, it is necessary to perform laborious calculations considering the flow rate amount detected by the flow rate sensor section and tank size. Thus, as described above, the measurement pipe is made detachable to the leakage detection device, and a measurement peip having an adequate inner cross-section area is attached to the device depending on the tank size. As a result, even without performing the laborious calculations, it is possible to allow the flow rate sensor section to output the same flow rate value in the case where the amounts of liquid leakages in the tanks are the same.

It is preferable that the measurement-slim pipe 13b, sheath pipes 17 and 171, sensor holder 13a, filter cover 12b, cap 16, and guide pipe Pg be made of metal having a heat expansion coefficient approximate to that of a material constituting the tank 1 and be made of the same metal as the material of the tank 1, such as casting iron or stainless steel.

Figure 4:
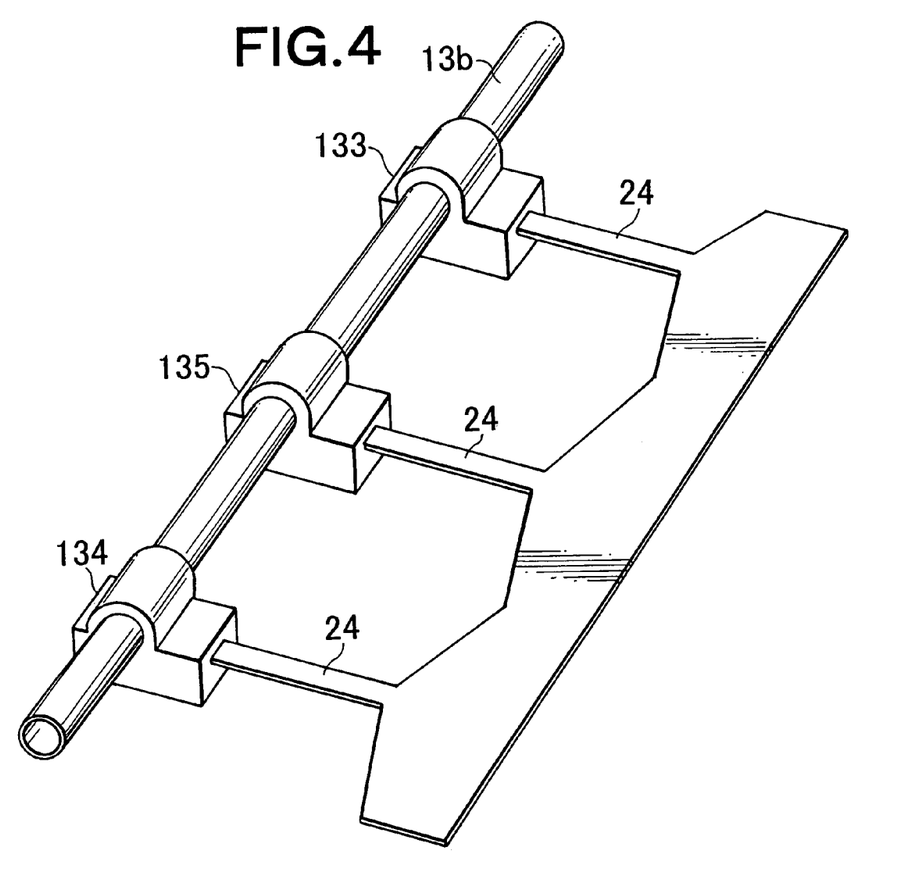
FIG. 4 is an enlarged perspective view showing a part where a first temperature sensor, indirectly heated sensor, and second temperature sensor are attached to a measurement slim-pipe.
Figure 5:
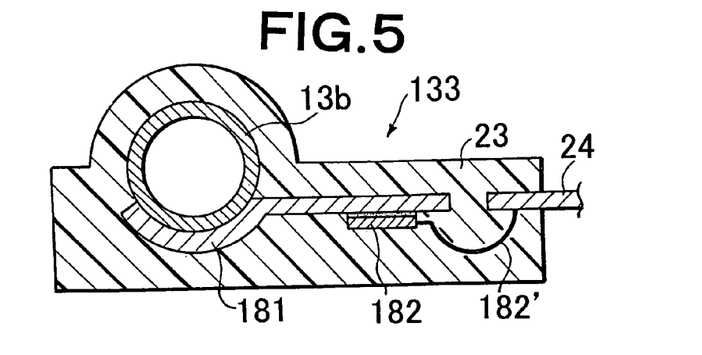
FIG. 5 is a cross-sectional view of FIG. 4.
Figure 6:
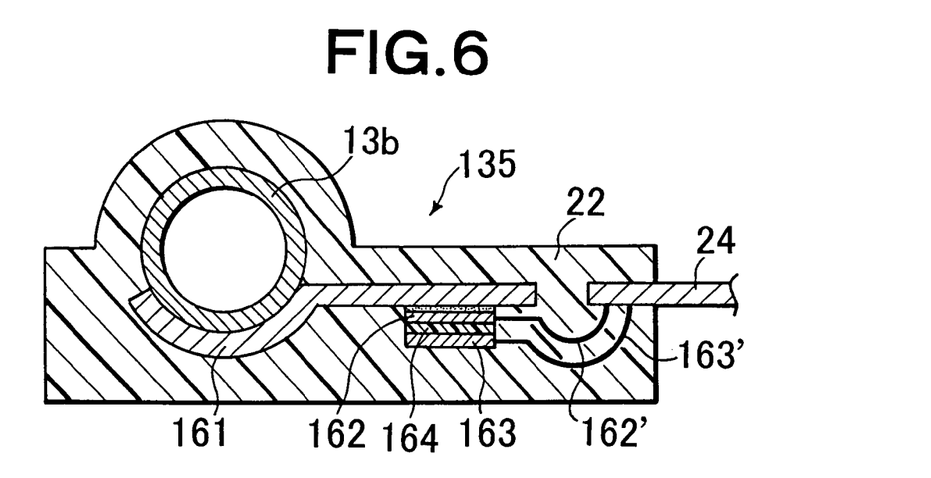
FIG. 6 is a cross-sectional view of FIG. 4.

FIG. 4 is an enlarged perspective view showing a part where the first temperature sensor 133, indirectly heated sensor 135, and second temperature sensor 134 are attached to the measurement slim-pipe, and FIGS. 5 and 6 are cross-sectional views of FIG. 4. As shown in FIG. 5, the first temperature sensor 135 has a heat transfer member 181 brought into contact with the outer surface of the measurement slim-pipe 13b and a thin-film temperature sensitive element 182 stacked on the heat transfer member 181 through a dielectric thin-film. The thin-film temperature sensitive element 182 is formed in a predetermined pattern. A wiring 182' is connected to the electrode of the thin-film temperature sensitive element 182 for current application to the thin-film temperature sensitive element 182. The heat transfer member 181 is made of metal or alloy having a thickness of, e.g., about 0.2 mm and width of 2 mm. The wiring 182' is connected to a wiring (not shown) formed on a wiring board 24 such as a flexible wiring board. The latter wiring is connected to the above wiring 18 in the guide pipe Pg. The heat transfer member 181, thin-film temperature sensitive element 182, and wiring 182' are sealed by a plastic sealing member 23 together with a part of the wiring board 24 and a part of the measurement slim-pipe 13b. The second temperature sensor 134 has substantially the same configuration as that of the first temperature sensor 133.

As shown in FIG. 6, the indirectly heated sensor 135 has a heat transfer member 161 brought into contact with the outer surface of the measurement slim-pipe 13b, a thin-film temperature sensitive element 162 stacked on the heat transfer member 161 through a dielectric thin-film, and a heater or thin-film heating element 163 stacked on the thin-film temperature sensitive element 162 through a dielectric thin-film 164. The thin-film temperature sensitive element 162 and thin-film heating element 163 are each formed in a predetermined pattern. Wirings 162' and 163' are connected to the electrodes of the thin-film temperature sensitive element 162 and thin-film heating element 163 for current application. The heat transfer member 161 is made of metal or alloy having a thickness of, e.g., about 0.2 mm and width of 2 mm. The wirings 162' and 163' are connected to a wiring (not shown) formed on the wiring board 24 such as a flexible wiring board. This wiring is connected to the wiring 18 inside the guide pipe Pg. The heat transfer member 161, thin-film temperature sensitive element 162, dielectric thin-film 164, thin-film heating element 163, and wirings 162' and 163' are sealed by a sealing member 22 made of synthetic resin together with a part of the wiring board 24 and a part of the measurement slim-pipe 14.

Figure 7:
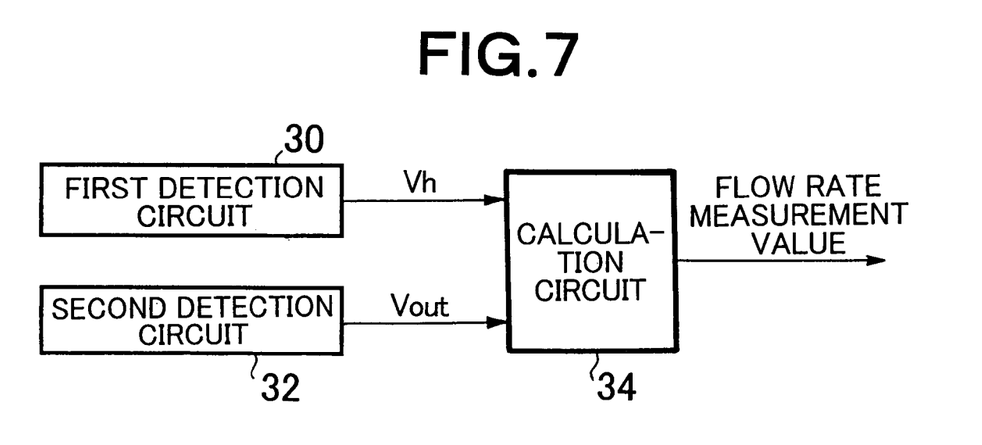
FIG. 7 is a block diagram showing a flow rate measurement system of the leakage detection device of FIG. 1.

A first detection circuit 30 of FIG. 7 is constituted by including the thin-film temperature sensitive element 162, thin-film heating element 163, and wirings 162' and 163' thereof. A second detection circuit 32 of FIG. 7 is constituted by including the thin-film temperature sensitive elements 182 of the first and second temperature sensors 133 and 134. An output (hereinafter referred to as "flow rate value output" or "output equivalent to flow rate") Vh equivalent to the flow rate value based on flow rate measurement of indirectly heated-constant heat generation-control temperature detection is obtained from the first detection circuit 30. An output (hereinafter, referred to merely as "output equivalent to flow rate value") Vout equivalent to the flow rate value based on flow rate measurement of two fixed-point temperature difference detection is obtained from the second detection circuit 32. These flow rate value outputs are input to a calculation circuit or calculation section 34 (CPU 68 to be described later) shown in FIG. 7.

The leakage detection device 11 having the configuration described above is attached to the measurement port 5 of the tank 1. Then, the liquid surface LS of the liquid L in the tank is positioned in the height range of the liquid pool 14. Accordingly, the pressure sensor 137 is immersed in the liquid L in the tank filtered by the filter 12a of the liquid inlet/outlet 12. Then, the liquid L rises through the measurement slim-pipe 13b of the flow rate measurement section 13 and introduced into the space G of the liquid pool section 14, with the result that the surface of the liquid in the liquid pool section 14 reaches the same height position as the liquid surface LS in the tank outside the leakage detection device. When the liquid surface LS varies, the surface of the liquid in the liquid pool section 14 correspondingly varies to cause liquid flow in the measurement slim-pipe 13b in association with this liquid surface variation, i.e., liquid level variation.

Figure 8:
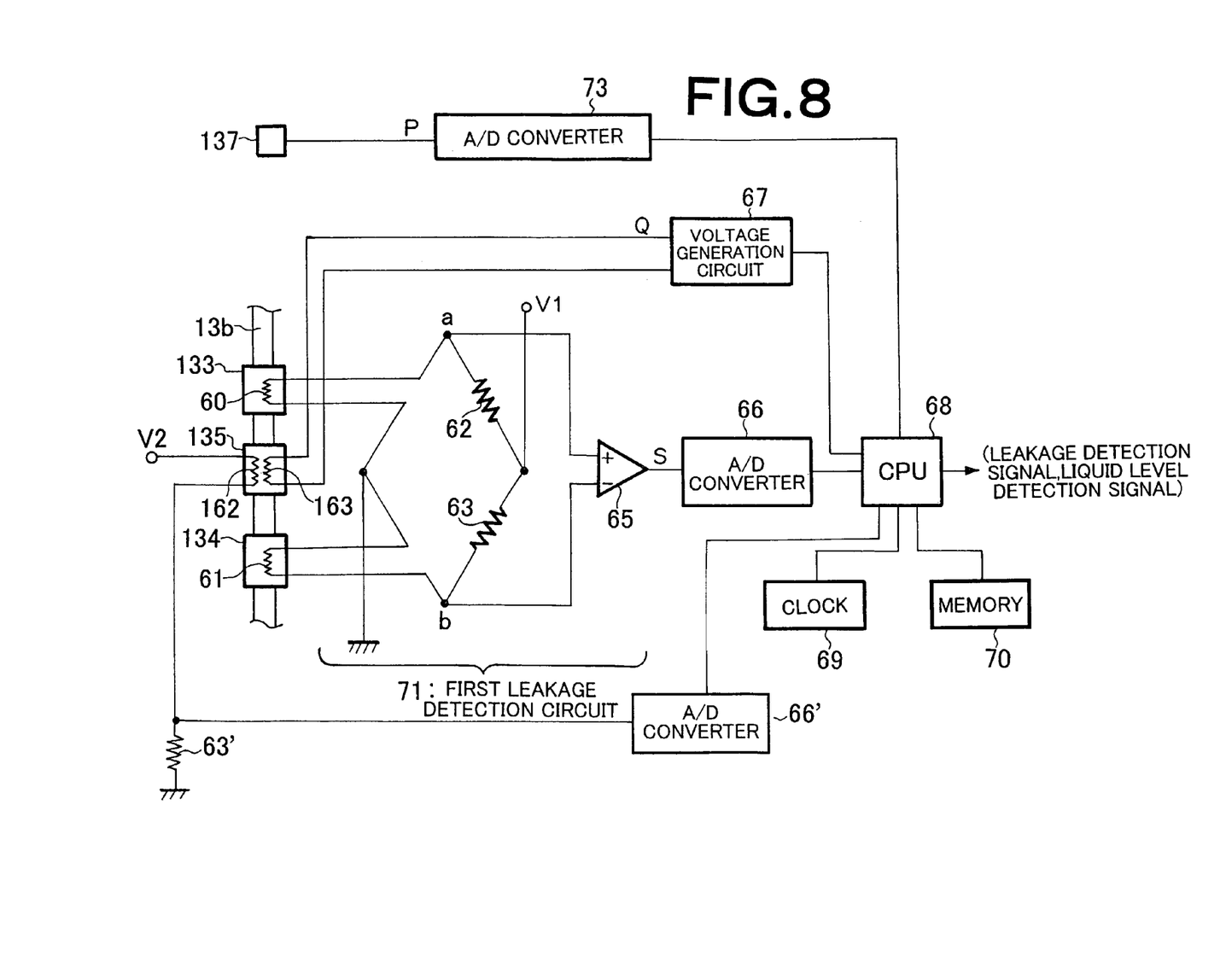
FIG. 8 is a view showing a circuit configuration of the flow rate sensor section, pressure sensor, and leakage detection controller.

FIG. 8 is a view showing a circuit configuration of the flow rate sensor section, pressure sensor, and leakage detection controller. As a power source for the circuits, a not-shown battery disposed in the circuit container 15 can be used.

The thin-film heating element 163 of the indirectly heated sensor 135 is connected to a voltage generation circuit 67. In the present embodiment, a constant voltage generation circuit is used as the voltage generation circuit 67. A constant voltage is applied from the constant voltage generation circuit to the thin-film heating element 163. Thin-film temperature sensitive elements 60 and 61 respectively constituting the first and second temperature sensors 133 and 134 are connected to a first leakage detection circuit 71. That is, the thin-film temperature sensitive elements 60 and 61 (same as the thin-film temperature sensitive element 182) constitute a bridge circuit together with resistors 62 and 63. A supply voltage V1 is supplied to the bridge circuit, and a voltage output signal corresponding to a potential difference between points a and b can be obtained by a differential amplifier 65. The output of the first leakage detection circuit 71, which corresponds to a difference in temperature sensed by the thin-film temperature sensitive elements 60 and 61 of the temperature sensors 133 and 134, is input to a CPU 68 through an A/D converter 66. Thus, a flow rate measurement based on temperature difference between two fixed points and leakage detection based on this flow rate measurement are performed. The output of a second leakage detection circuit constituted by including the thin-film temperature sensitive element 162 of the indirectly heated sensor 135 and a grounded resistor 63', which corresponds to temperature sensed by the thin-film temperature sensitive element 162, is input to the CPU 68 through an A/D converter 66'. Thus, a flow rate measurement based on indirectly heated-constant heat generation-control temperature detection and leakage detection based on this flow rate measurement are performed. The constant voltage generation circuit 67 operates under the control of the CPU 68. The output of the pressure sensor 137 is input to the CPU 68 through an A/D converter 73. Thus, the leakage detection based on liquid level variation rate with respect to time is performed. A clock 69 and a memory 70 are connected to the CPU 68.

In the present embodiment, a DC constant voltage Q (that is, a constant DC voltage) is applied from a constant voltage generation circuit used as the voltage generation circuit 67 of FIG. 8 to the thin-film heating element 163 of the indirectly heated sensor 135. As a result, the thin-film heating element 163 remains in a constant heat generating state. Part of the heat is transmitted to liquid in the measurement slim-pipe 13b through the heat transfer member 161 so as to be used as a heat source for heating the liquid.

Assuming that liquid is not distributed in the measurement slim-pipe 13b, i.e., the flow rate of liquid in the measurement slim-pipe 13b is 0, the temperature detected by the first and second temperature sensors 133 and 134 is substantially the same, if contribution of natural convection flow to the heat transfer is ignored. However, when liquid distribution occurs in the measurement slim-pipe 13b, the heat from the indirectly heated sensor 135 is transferred easier to the downstream side than to upstream side. As a result, a difference occurs between the temperatures that the first and second temperature sensors 133 and 134 detect. Since a voltage output corresponding to the difference between the temperatures detected by the first and second temperature sensors 133 and 134 corresponds to the liquid flow rate, the obtained voltage output can be set as a flow rate value output. That is, potentials at points a and b of the bridge circuit of the leakage detection circuit 71 are input to the differential amplifier 65. It is possible to obtain, from the differential amplifier, a voltage output S corresponding to the difference between the temperatures detected by the first and second temperature sensors 133 and 134 by appropriately setting resistance values of the resistors 62 and 63 of the bridge circuit in advance. The CPU 68 uses a stored calibration curve to convert the output voltage S into a corresponding flow rate value.

In the manner as described above, a flow rate measurement based on temperature difference between two fixed points and leakage detection based on this flow rate measurement are performed. In the flow rate measurement based on temperature difference between two fixed points according to the present invention, a value equivalent to the flow rate is obtained based on a temperature difference (actually, a difference in electrical characteristics corresponding to the detected temperature difference) detected by the first and second temperature sensors disposed on the upstream and down stream sides of the heater.

Further, the CPU 68 uses a stored calibration curve to convert the output obtained from the indirectly heated sensor 135 into a corresponding flow rate value. As a result, a flow rate measurement based on constant heat generation-control temperature detection and leakage detection based on this flow rate measurement are performed.

Further, the CPU 68 can immediately convert an output P equivalent to liquid level which is input from the pressure sensor 137 through the A/D converter 73 into a liquid level p. While the value of the liquid level p is based on the height of the pressure sensor 137, it is possible to convert the value to the liquid level value with respect to the height of the tank itself by taking into account the vertical position of the measurement port 5 of the tank 1 and distance from the attachment part of the leakage detection device to the measurement port to pressure sensor 137. A liquid level detection signal indicating results of the liquid level detection is output from the CPU 68.

The CPU 68 stores the value of the liquid level p in the memory 70 at a constant time interval of e.g., 2 to 10 seconds, calculates a difference between the current value and previous value for each storage operation, and stores the difference in the memory 70 as a value of liquid level variation rate p' with respect to time. Therefore, it is possible to obtain the leakage amount of liquid from the tank as the magnitude of liquid level variation rate p' with respect to time of the liquid level p measured by the pressure sensor 137. Thus, leakage detection based on liquid level variation rate with respect to time is performed.

Figure 9:
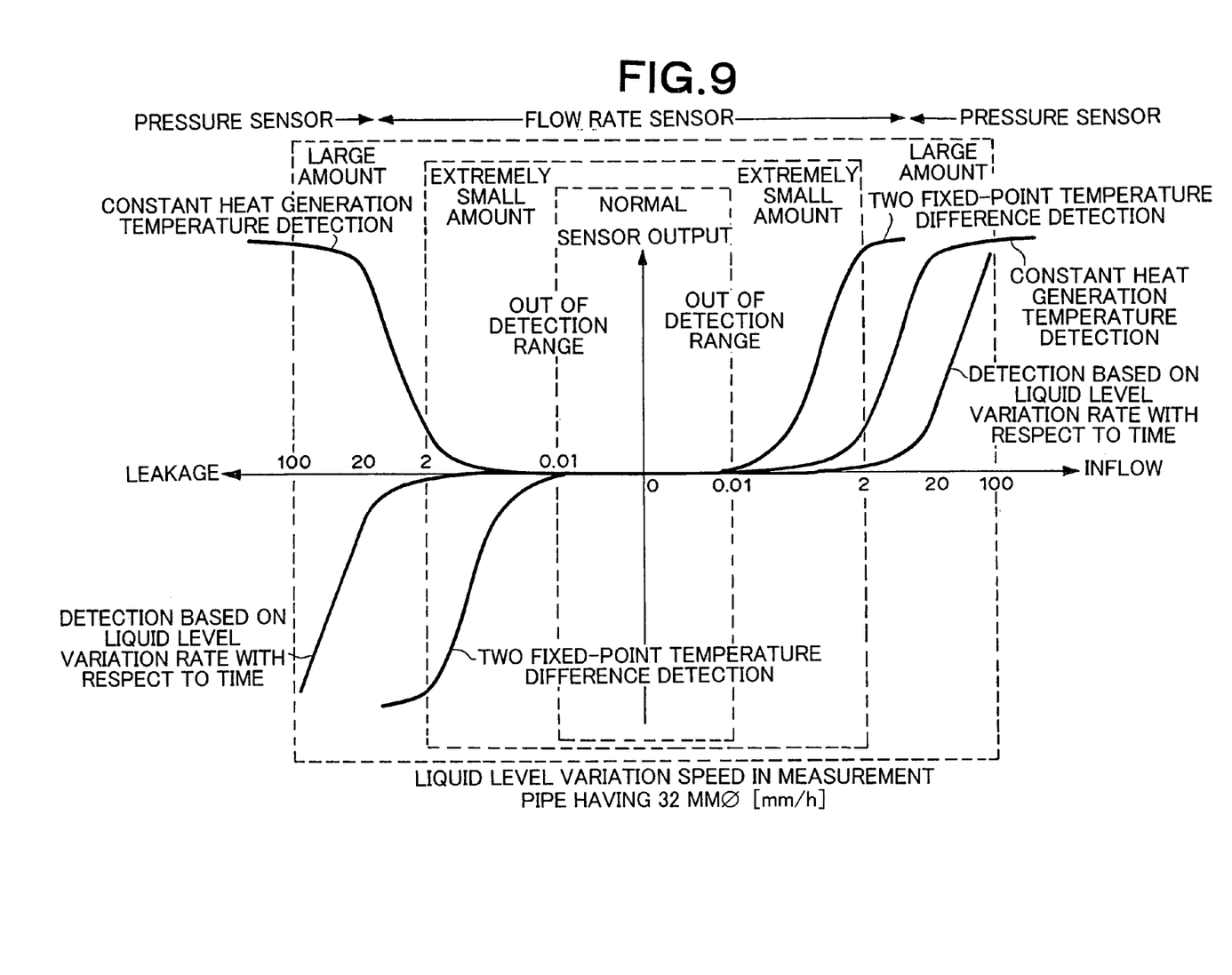
FIG. 9 is a view showing an example (calibration curve) of the sensor output corresponding to the liquid level variation speed in the leakage detection based on a flow rate measurement of two fixed-point temperature difference detection, leakage detection based on a flow rate measurement of constant heat generation-control temperature detection, and leakage detection based on liquid level variation rate with respect to time.

FIG. 9 is a view showing an example (calibration curve) of the sensor output corresponding to the liquid level variation speed in the leakage detection based on a flow rate measurement of two fixed-point temperature difference detection, leakage detection based on a flow rate measurement of constant heat generation-control temperature detection, and leakage detection based on liquid level variation rate with respect to time. In this example, a measurement pipe having an inner diameter of 32 mm is used. In the case where the absolute value of the liquid level variation speed is 0.01 [mm/h] or less, leakage detection is not performed as out of detection range, i.e., there is no substantial leakage. In the case where the absolute value of the liquid level variation speed is in the range of 0.01 to 15 [mm/h], leakage detection result based on the flow rate detection is output. As shown in FIG. 9, an absolute value range of 0.01 to 2 [mm/h] can be set as a predetermined range (first predetermined range) corresponding to leakage detection (first leakage detection) based on a flow rate measurement of two fixed-point temperature difference detection, an absolute value range of 10 to 100 [mm/h] can be set as a predetermined range (second predetermined range) corresponding to leakage detection (second leakage detection) based on liquid level variation rate with respect to time, and absolute value range of 1 to 20 [mm/h] can be set as a predetermined range (third predetermined range) corresponding to leakage detection (third leakage detection) based on a flow rate measurement of constant heat generation-control temperature detection. The above respective value ranges exhibit excellent detection sensitivity in respective detections.

In the case where a plurality of detection results that fall within the first to third predetermined ranges are obtained in the first to third leakage detections, the CPU 68 can output only one detection result by preferentially selecting the detection result in the order of a detection result of second leakage detection, that of first leakage detection, and that of third leakage detection.

A liquid level variation in the tank 1 occurs also when liquid is injected into the tank through the liquid inlet 6 or when liquid is supplied to the outside through the liquid supply port 7. However, the climbing or descending speed of liquid level in the tank 1 obtained in the above case is generally considerably larger than the liquid level variation speed or liquid level variation rate with respect to time obtained in the case where leakage occurs.

In light of the above, the CPU 68 performs the following processing for leakage in the present embodiment.

(1) In the case where the magnitude of the liquid level variation rate p' with respect to time falls within a predetermined range (e.g., 10 to 100 [mm/h]) in the second leakage detection, the CPU 68 outputs a result of the second leakage detection as a leakage detection signal.

(2) In the case where the magnitude of the liquid level variation rate p' with respect to time falls below the predetermined range (e.g., smaller than 10 [mm/h]) in the second leakage detection, the CPU 68 outputs a result of the first leakage detection as a leakage detection signal when the result of the first leakage detection shows a value within a predetermined range (e.g., within an absolute value range of 0.01 to 2 [mm/h]), outputs a result of the third leakage detection as a leakage detection signal when the result of the first leakage detection shows a value above the predetermined range (e.g., an absolute value above 2 [mm/h]), and determines that there is no leakage and does not output a leakage detection signal when the result of the first leakage detection shows a value below the predetermined range (e.g., an absolute value below 0.01 [mm/h]).

(3) In the case where the magnitude of the liquid level variation rate p' with respect to time falls above the predetermined range (e.g., larger than 100 [mm/h]) in the second leakage detection, the CPU 68 determines that the variation is due to causes (e.g., liquid injection or liquid supply) other than leakage and does not output a leakage detection signal.

Further, in the present embodiment, in the case where the situation as described in (3) occurs, i.e., in the case where the magnitude of the liquid level variation rate p' with respect to time falls above the predetermined range in the second leakage detection, the CPU 68 can stop the first and third leakage detections during subsequent predetermined time period. It is preferable that the predetermined time period be set to a time length slightly longer than the time needed for liquid surface LS to become flat after liquid is injected into the tank from outside or liquid is supplied from the tank to outside. For example, the predetermined time period can be set to a value ranging from 10 to 60 minutes. Particularly, during the predetermined time period, the CPU 68 can stop operations of the voltage generation circuit 67 and the first leakage detection circuit 71 and second leakage detection circuit 72, resulting in a reduction in power consumption.

The liquid level variation speed or liquid level variation rate with respect to time correlates with a leakage amount (leakage amount per unit time). That is, a value obtained by multiplying the liquid level variation speed or liquid level variation rate with respect to time by the horizontal cross-section area inside the tank obtained at a height position corresponding to the liquid level corresponds to the leakage amount of liquid. Therefore, it is possible to obtain the amount of leakage of liquid in the tank based on the liquid level and leakage (liquid level variation speed or liquid level variation rate p' with respect to time) detected as described above by previously storing the shape or size (i.e., relationship between the height position and horizontal cross-section inside the tank) in the memory 70 and referring to the stored data in the memory 70.

In the case where the tank has a vertical cylindrical shape as shown in FIG. 1, i.e., the horizontal cross-section inside the tank is constant irrespective of the vertical position, a simple proportional relationship is established between the liquid level variation speed or liquid level variation rate with respect to time and leakage amount. Therefore, it is possible to easily calculate the leakage amount by multiplying the liquid level variation speed or liquid level variation rate with respect to time by a proportional constant corresponding to the horizontal cross-section inside the tank without relation to the liquid level value itself. That is, in this case, leakage detected by the device of the present invention is substantially equal to a value obtained based on the leakage amount.

What is claimed is:

1. A device for detecting leakage of liquid in a tank, comprising:
    a measurement slim-pipe into/from the lower end of which the liquid in a tank is injected or discharged;
    a measurement pipe connected to the upper end of the measurement slim-pipe and having a cross-section area larger than that of the measurement slim-pipe;
    a flow rate sensor section for measuring the flow rate of liquid in the measurement slim-pipe, which is additionally provided to the measurement slim-pipe and includes a first temperature sensor, indirectly heated sensor and a second temperature sensor, the indirectly heated sensor being provided with a heater and third temperature sensor;
    a pressure sensor for measuring the liquid level of the liquid; and
    a leakage detection controller connected to the flow rate sensor section and pressure sensor,
    wherein the leakage detection controller has:
    a voltage generation circuit for applying a voltage to the heater;
    a first leakage detection circuit which is connected to the first and second temperature sensors and generates an output corresponding to a difference between temperatures sensed by the first and second temperature sensors; and
    a second leakage detection circuit which is connected to the indirectly heated sensor and generates an output corresponding to a temperature sensed by the third temperature sensor, performs:
    a first leakage detection to detect leakage of liquid in the tank based on a value equivalent to the liquid flow rate calculated using the output of the first leakage detection circuit;
    a second leakage detection to detect leakage of liquid in the tank based on the liquid level variation rate with respect to time measured by the pressure sensor; and
    a third leakage detection to detect leakage of liquid in the tank based on a value equivalent to the liquid flow rate calculated using the output of the second leakage detection circuit,
    and outputs at least one of detection results of the first to third leakage detections that fall within first to third predetermined ranges which are defined for each of the first to third leakage detections.

2. The device for detecting leakage of liquid in a tank as claimed in claim 1, wherein, in the case where a plurality of detection results that fall within the first to third predetermined ranges are obtained in the first to third leakage detections, the leakage detection controller outputs only one detection result by selecting it in the order of a detection result of second leakage detection, that of first leakage detection, and that of third leakage detection.

3. The device for detecting leakage of liquid in a tank as claimed in claim 1, wherein the leakage detection controller stops the first and second leakage detections for a predetermined time period in the case where the detection result of the second leakage detection falls above the second predetermined range.

4. The device for detecting leakage of liquid in a tank as claimed in claim 3, wherein the leakage detection controller stops operations of the voltage generation circuit and first and second leakage detection circuits for predetermined time period in the case where the detection result of the second leakage detection falls above the second predetermined range.

5. The device for detecting leakage of liquid in a tank as claimed in claim 1, wherein the voltage generation circuit is a constant voltage generation circuit for applying a constant voltage to the heater.

6. The device for detecting leakage of liquid in a tank as claimed in claim 1, wherein the measurement pipe is detachably attached to the leakage detection device.

7. The device for detecting leakage of liquid in a tank as claimed in claim 1, wherein the pressure sensor is disposed near the lower end of the measurement slim-pipe.

8. The device for detecting leakage of liquid in a tank as claimed in claim 1, wherein a circuit container is attached to the upper portion of the measurement pipe, and the leakage detection controller is disposed in the circuit container.

* * * * *